Jan. 10, 1967

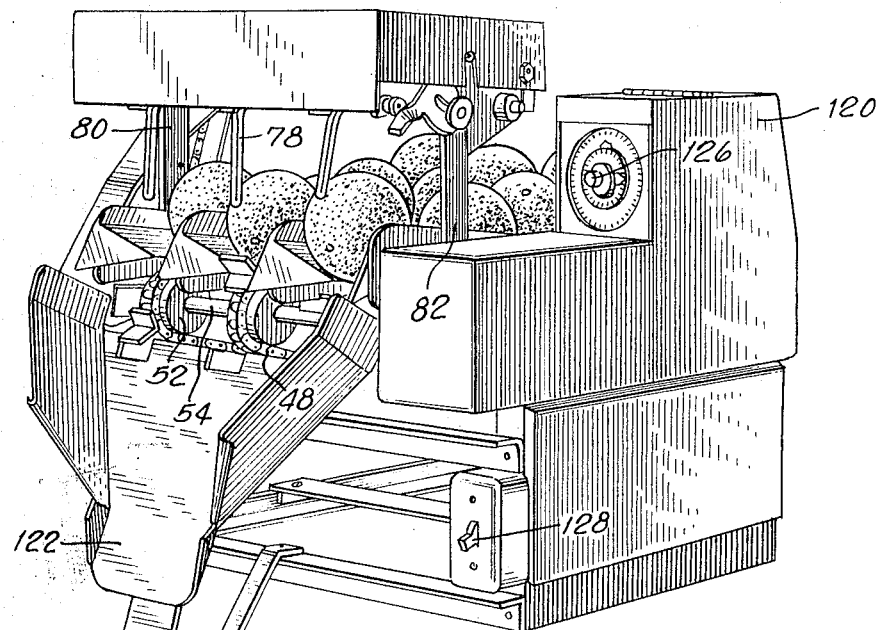
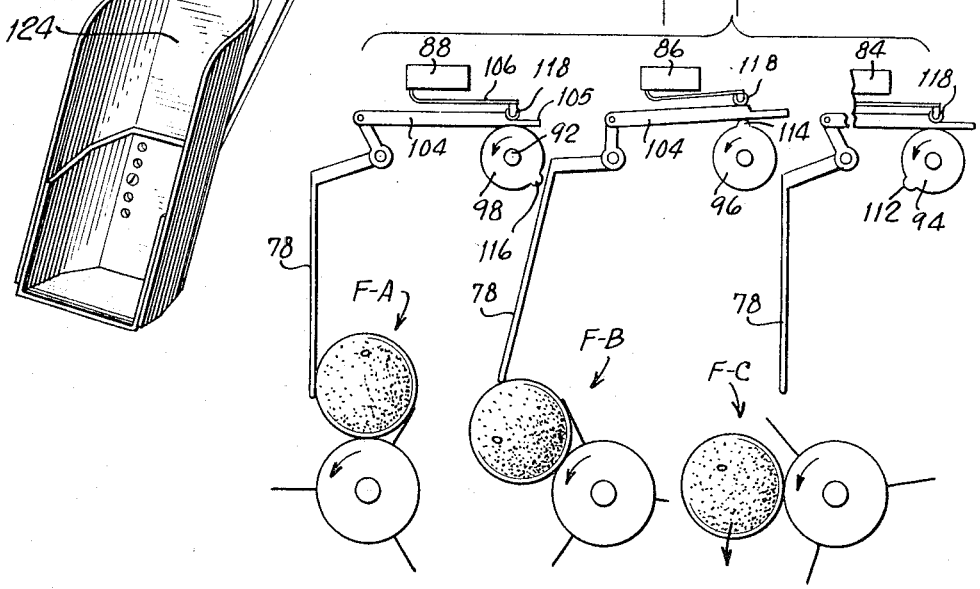

H. M. McLEARN 3,297,248

FRUIT COUNTER WITH IMPROVED CONVEYOR
AND CAMMED SWITCH OPERATOR

Filed Aug. 20, 1965

INVENTOR.
HERBERT M. McLEARN
BY
ATTORNEY

United States Patent Office 3,297,248
Patented Jan. 10, 1967

3,297,248
FRUIT COUNTER WITH IMPROVED CONVEYOR AND CAMMED SWITCH OPERATOR
Herbert M. McLearn, Maitland, Fla., assignor to American Machinery Corporation, Orlando, Fla., a corporation of Delaware
Filed Aug. 20, 1965, Ser. No. 481,368
10 Claims. (Cl. 235—98)

This invention relates to an automatic object delivering and counting machine. More particularly, the invention involves a machine for serially delivering and counting generally spherical objects such as fruits and vegetables.

The invention herein has been conceived as an improvement on my previous United States Patent 3,045,910, issued July 24, 1962.

The invention contemplates a machine adapted to convey a predetermined number of spherical or elliptical objects from a source of supply to a container and for counting such objects as they are being delivered. The invention embraces a counting and control mechanism so arranged that it will count each unit of the product as it contacts an impulse trigger. A plurality of delivery conveyors are provided to increase the delivery capacity of the machine, and the conveying and indexing controls are so arranged and timed that only one object at a time will transmit a counting impulse to the counting mechanism without regard to the number of conveyor courses employed.

It is intended to provide a mechanism comprising a plurality of downwardly inclined delivery conveyors for the objects to be delivered and counted. The delivery conveyors are integrated with an equal number of upwardly inclined discharge conveyors which deliver the objects to be delivered and counted into contact with the sensing and counting mechanism at the discharge end of the discharge conveyors by which the objects so delivered are counted with unfailing accuracy.

The invention having been conceived in connection with with the processing of fruit, its structure and operation will be described as a machine for delivering and counting fruit. It is, of course, obvious that the machine is adapted to the delivery and counting of any objects of generally spherical or elliptical shape.

The following specification when read in light of the drawings forming a part hereof will detail the construction, nature and operation of the invention. In the drawings, like reference numerals indicate the same or identical parts, and in these drawings:

FIGURE 1 is a perspective view of the counting machine in which the present invention is embodied;

FIG. 5 is a diagrammatic view showing the action of counting mechanism as fruit passes through the counting and discharge stage of the machine.

Figure 2:
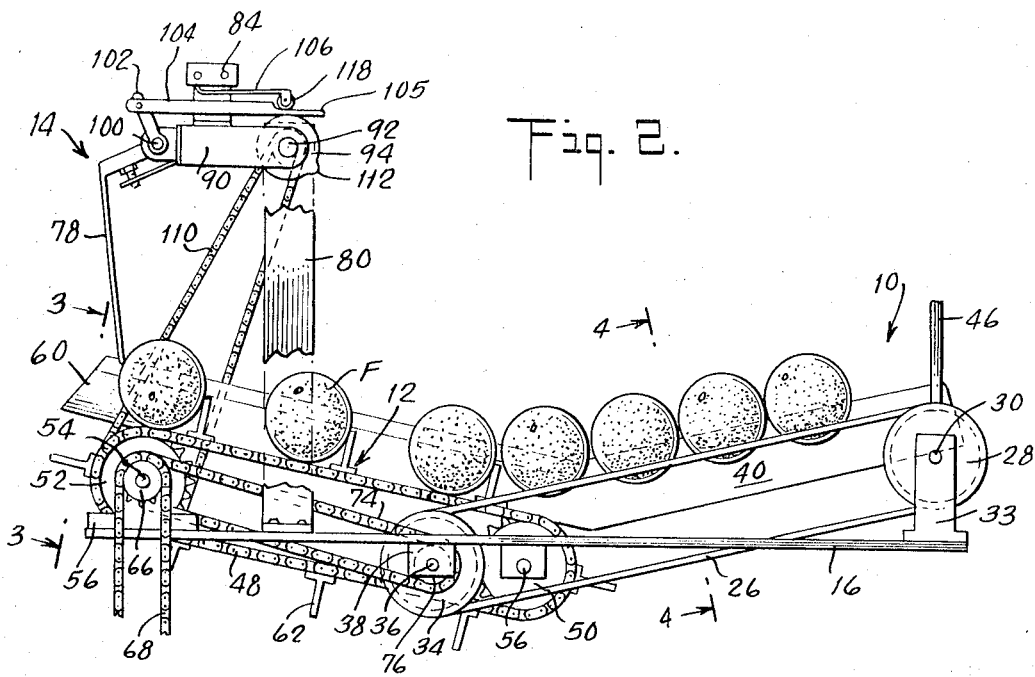
FIG. 2 is a more or less diagrammatic view corresponding to a longitudinal elevation through the machine and showing fruit conveyors and associated fruit counting mechanism.
Figure 3:
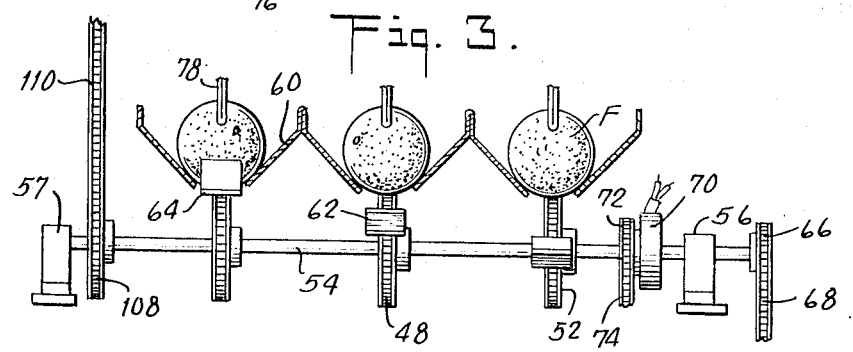
FIG. 3 is a view on line 3—3 of FIG. 2.
Figure 4:
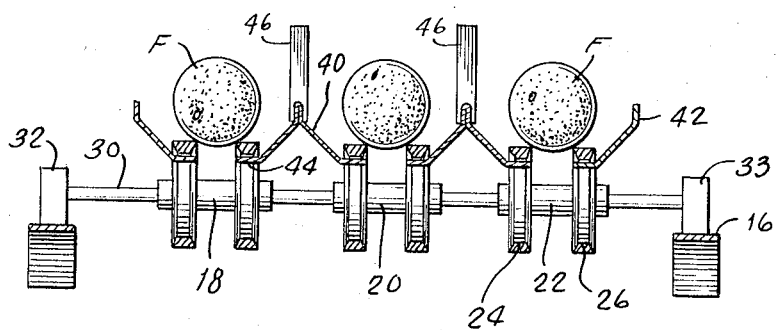
FIG. 4 is a view on line 4—4 of FIG. 2.

As shown in FIGS. 2, 3 and 4, the mechanism comprises a plurality of V-belt delivery conveyors 10 which are adapted to receive fruit at the inlet end of the counter. These V-belt delivery conveyors are downwardly inclined from the entry end to a point where they are integrated with an equal number of upwardly inclined flight chain discharge conveyors 12. At the discharge end of the mechanism, the flight chain discharge conveyors 12 deliver the fruit F into contact with fruit sensing and counting mechanism 14, as the fruit is discharged from the counting machine.

The conveyors and the counting mechanism are mounted on a machine bed 16. The delivery conveyors 10 are best shown in the cross-sectional view of FIG. 4. This figure shows three conveyor flights 18, 20 and 22. Three flights have been illustrated merely by way of example, it being obvious that any number of flights may be incorporated depending on the required counting and delivery capacity of the machine. Each delivery conveyor consists of a pair of V-shaped conveyor belts 24 and 26. These belts at their outer turn are trained about bushed idle sheaves 28 (FIG. 2) which are mounted on stationary shafts 30 held in bearing blocks 32 and 33 disposed at opposite sides of the machine frame. At the inner turn of the conveyor flights, the V-belts are trained about sheaves 34 (FIG. 2) which are keyed to a rotatable shaft 36. The shaft 36 is mounted in shaft bearings 38 at opposite sides of the machine frame. The shaft 36 is driven as to be described later.

The several delivery conveyors are defined by run separators comprising guide troughs. In FIG. 4, it can be seen that these run separators comprise upstanding walls which are adapted to confine fruit moving along the conveyor run to its own course. The run separators between intermediate conveyor courses comprise inverted, generally Y-shaped separators 40, whereas the outer wall of each extreme conveyor run is formed by merely an upwardly, outwardly inclined barrier 42 having a vertical lip along its free upper edge. Each of the run separating elements is formed with a horizontal surface 44 on which the V-belt elements are supported. A fruit separator in the form of an upstanding wire or rod 46 is provided between each of the conveyor runs to distribute and regulate the entrance of the fruit at the inlet of the delivery conveyor.

The details of the discharge conveyor are best shown in FIG. 3. In FIG. 2, the V-belts of the delivery conveyors are integrated with the discharge conveyors where their path intersects. Each set of downwardly inclined delivery conveyor V-belts, such as 24 and 26 in FIG. 4, will straddle a single flight chain discharge conveyor. Each flight chain discharge conveyor is comprised of a sprocket chain 48 which at its lower turn is trained about an eighteen-tooth No. 40 idle sprocket 50. At the upper, or outer turn, each flight chain delivery conveyor is trained about an eighteen-tooth No. 40 sprocket 52 which is keyed to a rotatable head shaft 54. The head shaft 54 is mounted in shaft bearings 56 and 57 at opposite sides near the front of the machine frame. It should be noted that the teeth on the several sprockets 52 are carefully aligned with each other by keying the sprockets to the head shaft.

The sprockets 50 (FIG. 2) at the lower turn of the discharge conveyors are mounted as idle sprockets on a shaft 56 which is held in shaft bearings 58 at opposite sides of the machine frame, the shaft bearings 58 being adjustable on the machine frame for conveyor chain take-up.

As best seen in FIG. 3, the flight chain discharge conveyor is also provided with run separators 60 comprising guide troughs. These separators are of the same construction and configuration as those provided in the delivery conveyor with the exception that the shoulders 44 of the latter have been omitted from the former. In the flight chain discharge conveyor, the sprocket chains 48 are located in a gap between the several run separator elements, these gaps being sufficiently wide to permit the free passage of flight paddles 62. A plurality of attachments 64 are fixed to the sprocket chains 48 and the flight paddles 62 are welded to these fixtures. In one practical embodiment of the invention, the flight chains 48 were composed of twenty inches of No. 40 sprocket chain and the flight paddles 62 were attached to the flight chain on three inch centers.

As best seen in FIG. 3, the head shaft 54 with which the sprockets 52 rotate is driven from a drive sprocket 66 and through a chain drive 68 which is driven by a motor (not shown). The head shaft 54 delivers drive to an electric clutch 70 which, in turn, when energized, will rotate the head shaft 54 and also a drive sprocket 72 mounted to rotate therewith. The drive sprocket 72 drives a sprocket chain drive 74 which, as seen in FIG. 2, is in driving connection with a drive sprocket 76 keyed to the rotatable drive shaft 36 at the lower turn of the V-belt delivery conveyor. Thus, not only is the flight chain discharge conveyor 12 driven, but also the V-belt delivery conveyor 10.

As the fruit is carried to the discharge end of the discharge conveyor by the flight paddles 62, it comes into contact with the counting mechanism 14. As seen in FIG. 3, each discharge conveyor flight has associated therewith a fruit contact arm 78. A pair of upright frame members 80 and 82 (FIG. 1) are mounted on the front part of the machine bed 16 for the purpose of supporting a plurality of microswitches 84, 86 and 88 (FIG. 5) as diagrammatically indicated in FIG. 5. These microswitches correspond in number to the number of discharge conveyor flights and the fruit contact arm 78 of each switch will extend over the discharge end of the discharge conveyor with which the respective switch is associated. Each switch is mounted on a generally U-shaped bracket 90 (FIG. 2) which extends forwardly from a frame supported by the uprights 80 and 82. Also mounted for rotation in the upright frame members 80 and 82 is a driven cam shaft 92 which has contact cams 94, 96 and 98 keyed thereto. These cams are respectively associated with the microswitches 84, 86 and 88. Each of the generally U-shaped brackets 90 has formed at its forward end a bushing 100 for mounting the upper end of its fruit contact arm 78 and an actuating finger 102 connected to oscillate in unison with its fruit contact arm 78. The actuating finger 102 is pivoted to an interposer 104 which extends rearwardly and whose bottom surface rests upon its associated contact cam. Each of the interposers has a rearwardly extending free end 105 which is formed as a wedge whereby it is adapted to operate its associated switch operating lever 106 as it is reciprocated under the influence of the actuating finger 102. As shown in FIG. 3, the cam shaft 92 (FIG. 2) is driven from a head shaft sprocket 108 through the medium of a sprocket chain 110.

As shown in FIG. 5, the cams 94, 96 and 98 have formed thereon cam lobes 112, 114 and 116, respectively. These cam lobes (one for each cam) are displaced 120° starting opposite their keyway.

In timing the discharge conveyor flight chains 48, the first chain is installed at random. The second chain is then installed with one of the flight paddles 62 advanced two teeth in the forward direction in relation to the flight chain previously installed. The third chain is then advanced two more teeth in respect to the second chain position. Each advance constitutes 40°. When the chains are properly installed, there is a variance of 40° in relation to any of the flights to the adjacent fruit conveyor runs.

The timing of the cams 94, 96 and 98 must be such that when a piece of fruit is in position F–A (FIG. 5), the cam lobe 116 for the corresponding conveyor run will be 120° clockwise from top dead center. At this point, the fruit is coming into its area of contact with the fruit contact arm 78. It will be noted at this point the switch roller 118 is in a lower position on the interposer 104. As the fruit moves forward as in position F–B, it has engaged and swung the fruit contact arm 78 forwardly with the result that the interposer 104 is reciprocated rearwardly thereby elevating the switch operating roller 118. During this movement, the lobe 114 of the cam 96 has moved counterclockwise 120° to top dead center. As the interposer 104 is initially moved to elevate the switch operating roller 118, it effectively conditioned the switch 86 for operation by the cam lobe, but not of itself to the point of transmitting an impulse. An electrical impulse is generated when the cam lobe 114 has moved under the interposer as shown in FIG. 5. This is the point at which the switch is momentarily closed by the cam lobe 114 and an impulse is transmitted to a conventional electric counter 120 which is shown in FIG. 1. After the cam lobe passes under the interposer 104, the contact will be broken even though the fruit contact arm 78 and the interposer are still in contact position. There can be no further impulse from that particular conveyor run until its cam lobe has made a complete revolution. Immediately after the cam lobe has made its contact, the fruit will have moved into the discharge position shown as F–C in FIG. 5.

As the fruit is discharged from the several conveyor runs, it will drop into a discharge chute 122, and if desired, it may be taken from that point or it may be further delivered to a bagging attachment 124.

Since there are three count positions per revolution of each head shaft sprocket 52, it is necessary to drive the cam shaft 92 three times as fast as the head shaft sprockets 52. The chain drive 110 and the relative size of the sprockets connected therewith achieve this ratio. Advancing or retarding the delivery point can be achieved by freeing the drive sprocket on the cam shaft 92 and thereafter adjusting the cam shaft 92 to meet the requirements.

As seen from the foregoing, fruit contact arms 78 and their related interposers 104 will have conditioned their associated microswitches 84, 86 and 88 to a point just short of contact at the point of fruit discharge. As the cam lobes 112, 114 and 116 move their associated interposers 104 upwardly, the switch contact is completed and a short impulse is accordingly transmitted to the counter 120. Due to the rapidity of the cam movement, the switches are in a closed position for only a short time. This is desirable in that the impulses to the counter are evenly spaced and are of very short duration thereby avoiding all possibility of overlap of signals. The switches 84, 86 and 88 are wired into the counter 120 in parallel.

The machine is set into operation by setting a control knob 126 of the counter 120 to a predetermined position representing the number of pieces desired for any given delivery unit. A switch 128 is then closed. This effectively connects the drive motor and the counter into circuit. A momentary foot switch (not shown) is depressed such that the counter will now energize the electric clutch 70 and the head shaft 54 will now turn. The fruit within the downwardly inclined runs of the delivery conveyors will be moved forward by means of the V-belts and will be picked up and indexed by the upwardly inclined chain flights. As the fruit passes under the fruit contact arms 78, the trigger mechanism is operated, as described, and the fruit is counted by the counter 120. When the predetermined count has been reached, the clutch 70 will be disengaged by the counter 120, stopping the flight chains and the V-belts. The full bag of fruit is removed and replaced with an empty one. The cycle then may be repeated as may then be required.

It can be readily seen that each discharged piece of fruit is counted without fail and that any flights that have no fruit therein will not trigger an impulse to the counting mechanism.

From the foregoing, it can be seen that since the flight chains 48 have been integrated between the pairs of V-belts 24 and 26, a distinct advantage is obtained inasmuch as the transfer of the fruit from the V-belts 24–26 to the flight chains 48 eliminates the churning effect of the fruit which is common in conventional fruit counters, such as the drum type pick-up of my above-mentioned patent. Moreover, there is little or no chance that any extra fruit will be dropped into the discharge chute after the machine has finished its count because of the smaller peripheral movement at the point of delivery. The contact and delivery point is at an elevation and this also helps to eliminate the discharge of extra fruit.

The counting machine herein is, therefore, not only extremely accurate but it will have a very high production speed, as well as great flexibility due to the ease and simplicity in making adjustments.

While the novel features of the invention have been illustrated and described in connection with a specific embodiment of the invention, it is believed that this embodiment will enable others skilled in the art to apply the principles of the invention in forms departing from the exemplary embodiment herein, and such departures are contemplated by the claims.

I claim:

1. In a machine for delivering and counting generally spherical objects, a delivery conveyor, an upwardly inclined discharge conveyor intersecting the lower end of said delivery conveyor and being integrated with said delivery conveyor to receive objects therefrom, means for driving said conveyors, a counter, a normally inoperative electrical contact adapted when closed to transmit an actuating impulse to said counter, means operative with the movement of said delivery conveyor for conditioning said contact to close, and means at the discharge end of said discharge conveyor for sensing the discharge of objects therefrom and for closing said contact so conditioned, whereby an operating impulse is transmitted to said counter upon discharge of each successive object.

2. The apparatus of claim 1, in which said delivery conveyor comprises a pair of spaced V-belts and said discharge conveyor comprises a flight chain integrated between said V-belts at the intersection of the two conveyors.

3. The apparatus of claim 1, in which said discharge conveyor has affixed a plurality of equally spaced means for engaging and advancing successive objects.

4. The apparatus of claim 1, in which said contact is an electric switch and in which the means for sensing the discharge of objects comprises a pivoted arm in the discharge path, said arm being connected to an interposer for operating the latter to precondition said electric switch, in combination with a rotary switch operating cam driven in synchronism with said discharge conveyor, whereby said switch is closed momentarily during each revolution of said cam to transmit to said counter said counter actuating impulse.

5. In a machine for delivering and counting generally spherical objects, a plurality of delivery conveyors located in a common plane, a separate upwardly inclined discharge conveyor intersecting the lower end of each of said delivery conveyors and being integrated therewith to receive objects therefrom, said discharge conveyors being arranged in a common plane, common drive means for all of said conveyors, equally spaced object engaging and advancing means on said discharge conveyors, said engaging and advancing means on said discharge conveyors being staggered as to each conveyor whereby the discharge from said conveyors is in serial order, a counter, a normally inoperative electrical contact associated with each discharge conveyor adapted when closed to transmit an actuating impulse to said counter, means operative with the movement of said delivery conveyor for conditioning said contacts to close, and mechanism at the discharge end of each of said discharge conveyors operable by the discharge of objects therefrom for closing said contacts so conditioned, whereby an operating impulse is transmitted to said counter.

6. The apparatus of claim 5, in which said contacts comprise an electric switch associated with each of said conveyors and separate cyclically operable means associated with each switch adapted to momentarily close said switches when preconditioned for closure by said preconditioning means.

7. The apparatus of claim 5, in which the mechanism at the discharge end of a discharge conveyor comprises a contact arm pivoted in each path of discharging objects and said contacts each comprises an electric switch, a rotary cam associated with each said switch, an interposer for preconditioning each said switch for operation, means connecting each said interposer with its associated contact arm for operation of the former upon operation of the latter whereby each said switch is preconditioned for operation when a discharging object operates its contact arm, and a rotary cam adapted to close momentarily and at a predetermined time each said switch when preconditioned by its associated interposer.

8. The apparatus of claim 5, in which said mechanism for transmitting an actuating impulse to said counter comprises an object contact arm in the discharge path of each of said discharge conveyors, an electric switch for each of said discharge conveyors, said contact arms each having connected thereto an interposer adapted to precondition for operation its associated switch when said contact arms are operated by the discharge of objects, a separate rotatable switch operating cam associated with each of said interposers, common drive means for cyclically driving said cams, and switch closing lobes on said cams angularly spaced from each other by an equal distance, whereby preconditioned switches are momentarily closed in serial order.

9. In a machine for delivering and counting generally spherical objects, a downwardly inclined delivery conveyor, and upwardly inclined discharge conveyor intersecting the lower end of said delivery conveyor and being integrated with said delivery conveyor to receive objects therefrom, equally spaced means on said discharge conveyor for engaging and advancing objects, a counter, a switch, means at the discharge end of said discharge conveyor for sensing the discharge of objects therefrom and for conditioning said switch for operation, rotary means associated with said switch for cyclically operating the latter and thereby transmitting a momentary counter operating impulse through said switch to said counter when said switch is conditioned for operation, and common drive means for driving said conveyors and said rotary switch operating means in synchronism.

10. In a machine for delivering and counting generally spherical objects, a plurality of downwardly inclined delivery conveyors arranged in a common inclined plane, an upwardly inclined discharge conveyor intersecting each of said delivery conveyors, said discharge conveyors being arranged in a common inclined plane, equally spaced means on said discharge conveyors for engaging and advancing objects, said last named means on respective discharge conveyors being staggered in respect to each other whereby said conveyors are conditioned to dischrge objects in serial order, a counter, an electric switch associated with each discharge conveyor, object operated means in the discharge path of each of said discharge conveyors adapted to precondition its associated switch for operation, separate rotary means associated with each of said switches adapted for the sequential closure of said switches when preconditioned, and common drive means for said conveyors and said switch closure means whereby said conveyors and said switch closure means are driven in synchronism.

References Cited by the Examiner

UNITED STATES PATENTS

| | | | |
|---|---|---|---|
| 1,754,047 | 4/1930 | Reaves. | |
| 1,900,907 | 3/1933 | Buxton | 198—40 X |
| 2,304,982 | 12/1942 | Wilckens | 235—98 |
| 2,928,599 | 3/1960 | Ahlburg | 235—98 |
| 3,045,910 | 7/1962 | McLearn | 235—98 |

RICHARD B. WILKINSON, *Primary Examiner.*

TERRY J. ANDERSON, *Assistant Examiner.*